Aug. 9, 1938.   H. J. GOFF ET AL   2,126,382
BAND SAW
Filed Jan. 27, 1936
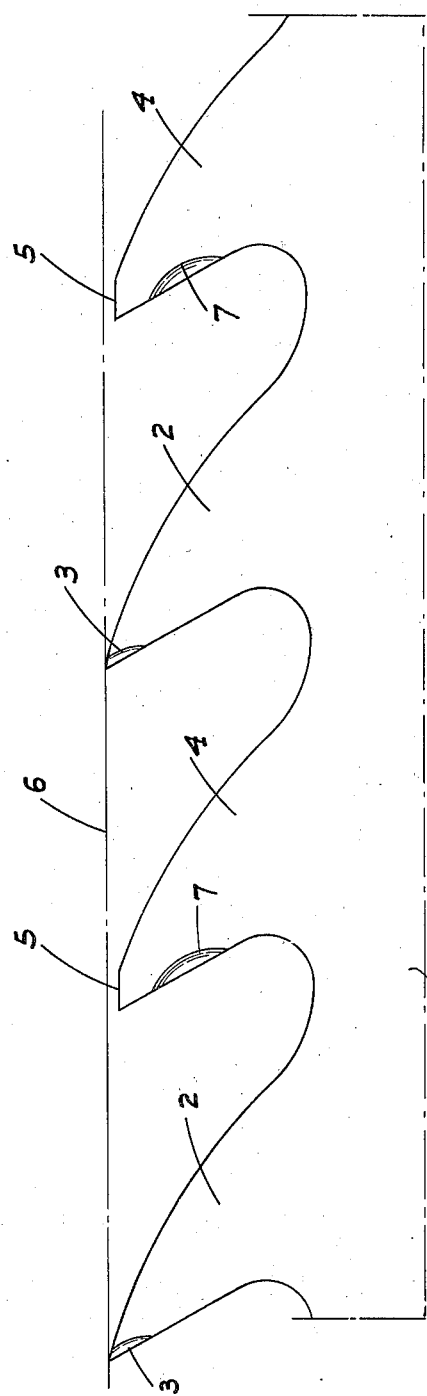
INVENTORS
H. J. Goff
E. O. Setzer
BY
ATTORNEY Patented Aug. 9, 1938

2,126,382

UNITED STATES PATENT OFFICE 2,126,382

BAND SAW

Henry J. Goff and Emil O. Setzer, Stockton, Calif., assignors to Stockton Box Company, Stockton, Calif., a corporation Application January 27, 1936, Serial No. 61,066

1 Claim. (Cl. 143—140)

This invention relates to saws, and particularly to band saws of large size for cutting heavy lumber. The principal object of our invention is to provide a saw of this character whose teeth are arranged so that a faster, truer, and cleaner cut may be made than is the case with saws as ordinarily constructed, and less power is necessary to operate the saw.

Figure 1 of the drawing is a fragmentary side elevation of a band saw constructed according to our invention.

Fig. 2 is a perspective view showing the relative arrangement of the cutting and cleaning teeth.

Referring now more particularly to the characters of reference on the drawing, the saw comprises a body 1 having cutting teeth 2 of conventional form projecting from one edge thereof. These teeth are swage-set at their tips as at 3 and as is customary.

These teeth are spaced apart a distance double that of the conventional spacing and other teeth 4 project from the body centrally between the teeth 2. While these teeth 4 are of the same general form as the teeth 2, they do not extend to the line of the points of the teeth 2, being instead cut away or blunted at their outer ends as shown at 5 so that the outer edges of the teeth 4 are substantially parallel to and inwardly of a line 6 projected between the points of the teeth 2. Also the leading edges of the teeth 4 are swaged for a considerable distance centrally of or intermediate their ends, as shown at 7.

As a result of this construction the teeth 4 therefore form cleaning rather than cutting teeth, the swaging of said teeth cleaning the sawdust out of the saw cut or slot made by the teeth 2. Said teeth 2 are thus enabled to run faster and easier than is ordinarily the case since the slot is kept constantly clean by the action of the centrally swaged teeth 4 and there is no chance for the sawdust to become clogged in the slot as very often happens, especially if the lumber is wet or pitchy.

Also this swaging of the teeth 4 being along their central portion, the slot is widened along the corresponding zone and the binding effect of the wood at the sides of the cut against the teeth 2 is eliminated, thus allowing said teeth to run with less friction and consequently truer and with less power being necessary to operate the saw.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A saw blade comprising a plurality of spaced teeth extending along one edge of the body of the blade, each alternate tooth being a cutting tooth and the intermediate teeth being cleaning teeth, each cutting tooth having its cutting edge extending laterally to each side of the body of the tooth and the sides of such edge converging toward each other from the point of the cutting tooth into the body of the tooth just back of the point of such tooth, each cleaning tooth having cutting edges extending laterally to each side of the tooth at a point intermediate the outer end and the throat of the tooth and commencing at a point substantially in line with a line through the point at which the sides of the cutting edge of the cutting tooth converge into the body of the tooth, and the cutting edges of the cleaning tooth extending laterally beyond the plane of the widest portion of the cutting edge on the cutting tooth.

HENRY J. GOFF.
EMIL O. SETZER.